United States Patent
Demirhan et al.

(10) Patent No.: US 7,853,853 B2
(45) Date of Patent: Dec. 14, 2010

(54) DEVICE, SYSTEM, AND METHOD OF MULTI-LEVEL FEEDBACK

(75) Inventors: Mustafa Demirhan, Hillsboro, OR (US); Ali Taha Koc, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 11/865,734

(22) Filed: Oct. 2, 2007

(65) Prior Publication Data
US 2009/0086845 A1   Apr. 2, 2009

(51) Int. Cl.
*H03M 13/00*   (2006.01)
(52) U.S. Cl. .............. 714/751; 714/755; 714/794; 714/795; 714/796
(58) Field of Classification Search .............. 714/748, 714/751, 795–796; 375/262, 341
See application file for complete search history.

(56) References Cited

U.S. PATENT DOCUMENTS

| | | | |
|---|---|---|---|
| 7,159,168 B2* | 1/2007 | Whinnett et al. | 714/794 |
| 7,246,295 B2* | 7/2007 | Xu | 714/755 |
| 7,454,684 B2* | 11/2008 | Allpress | 714/755 |
| 2007/0067703 A1* | 3/2007 | Berkmann et al. | 714/794 |
| 2008/0115031 A1* | 5/2008 | Shen | 714/755 |
| 2008/0192842 A1* | 8/2008 | Fei et al. | 375/260 |

* cited by examiner

*Primary Examiner*—Esaw T Abraham
(74) *Attorney, Agent, or Firm*—Shiloh et al.

(57) ABSTRACT

Device, system, and method of multi-level feedback. In some embodiments, an apparatus includes: an estimator to estimate a likelihood of correctly decoding an incoming encoded Hybrid Automatic Repeat Request packet of an incoming wireless communication signal by one or more decoders of the apparatus; and a transmitter to transmit a multiple-bit representation of the likelihood of correctly decoding the incoming encoded Hybrid Automatic Repeat Request to a device that transmitted the incoming encoded Hybrid Automatic Repeat Request packet.

16 Claims, 3 Drawing Sheets

DEVICE, SYSTEM, AND METHOD OF MULTI-LEVEL FEEDBACK

BACKGROUND

A wireless communication system may include, for example, a Mobile Subscriber Station (MSS) able to communicate with a Base Station (BS). The system may utilize a Hybrid Automatic Repeat Request (HARQ) scheme in order to improve link utilization via time diversity. For example, in a downlink, the BS transmits to the MSS an encoded HARQ packet, and waits for a response from the MSS.

If the MSS is able to correctly decode the HARQ packet, the MSS transmits to the BS a single-bit Acknowledgement (ACK). Once the BS receives the single-bit ACK the BS proceeds to transmit a subsequent packet queued for transmission.

In contrast, if the MSS fails to correctly decode the HARQ packet, the MSS transmits to the BS a single-bit Negative Acknowledgement (NACK). The MSS may store the incorrectly received packet, for further re-processing with subsequent re-transmission packet(s). Once the BS receives the single-bit NACK, the BS transmits to the MSS another encoded HARQ packet. The BS may continue to re-transmit the encoded HARQ packet until the BS receives from the MSS a single-bit ACK, or until a maximum allowed number of retransmissions is reached.

The HARQ mechanism may further be utilized in uplinks. For example, the MSS transmits to the BS an encoded HARQ packet, and the BS transmits to the MS a single-bit ACK or a single-bit NACK.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
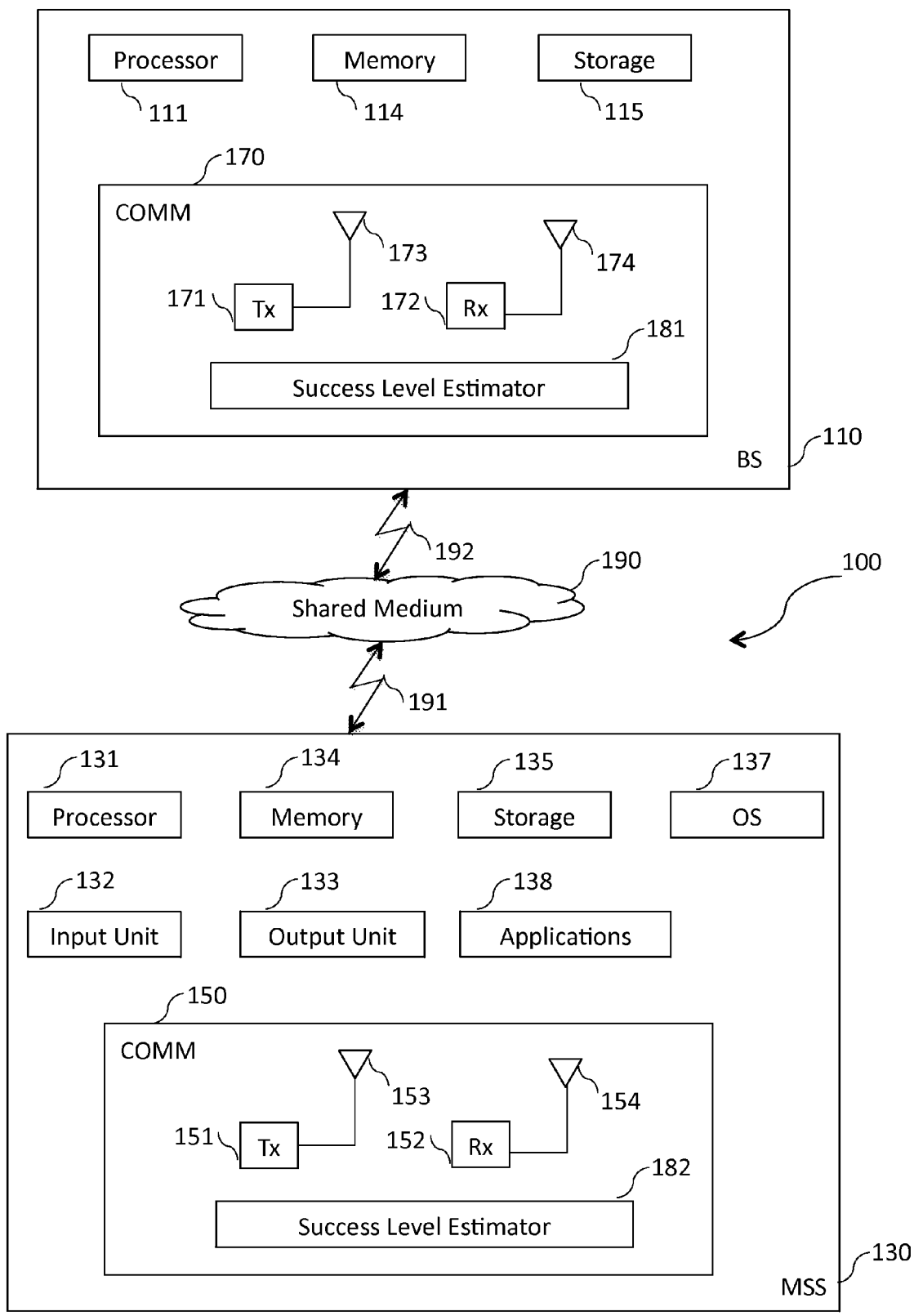
FIG. 1 is a schematic block diagram illustration of a wireless communication system in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2 G, 2.5 G, 3 G, Third Generation Partnership Project (3 GPP), 3.5 G, or the like. Embodiments of the invention may be used in various other devices, systems and/or networks.

FIG. 1 schematically illustrates a block diagram of a wireless communication system 100 in accordance with some demonstrative embodiments of the invention. System 100 may include, one or more wireless communication devices or stations, for example, a Mobile Subscriber Station (MSS) 130, as well as one or more wireless Access Points (APs) or base stations or routers, for example, a Base Station (BS) 110. The components of system 100 may communicate using a shared medium 190, for example, using wireless links 191 and 192.

MSS 130 may be or may include, for example, a mobile phone, a cellular phone, a handheld device, a computing device, a computer, a Personal Computer (PC), a server computer, a client/server system, a mobile computer, a portable computer, a laptop computer, a notebook computer, a tablet computer, a network of multiple inter-connected units or devices, or the like.

MSS 130 may include, for example, a processor 131, an input unit 132, an output unit 133, a memory unit 134, a storage unit 135, and a communication unit 150. MSS 130 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 137 of MSS 130 or of one or more applications 138.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by MSS 130.

Communication unit 150 includes, for example, a wireless transceiver, a wireless modem, a wireless Network Interface Card (NIC), or the like. For example, communication unit 150 includes a transmitter 151 and a receiver 152.

Transmitter 151 includes, for example, a wireless Radio Frequency (RF) transmitter able to transmit wireless RF signals, blocks, frames, transmission streams, packets, messages and/or data, e.g., through an antenna 153.

Receiver 152 includes, for example, a wireless Radio Frequency (RF) receiver able to receive wireless RF signals, blocks, frames, transmission streams, packets, messages and/or data, e.g., through an antenna 154.

Optionally, transmitter 151 and receiver 152 may be implemented using a transceiver, a transmitter-receiver, or other suitable component. Optionally, antenna 153 and antenna 154 may be implemented using a common antenna, a common set of multiple antennas, or other suitable component(s). For example, antenna 153 and/or antenna 154 may include an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some embodiments, some or all of the components of MSS 130 may be enclosed in a common housing or packaging, and may be interconnected or operably associated using one or more wired or wireless links. In other embodiments, components of MSS 130 may be distributed among multiple or separate devices or locations.

BS 110 may be or may include, for example, a wireless AP, a wireless base station, a wireless controller, a wireless router, a component of an ad-hoc network operating as an AP or a router, an AP of a Basic Service Set (BSS), a device operating as AP in an Independent BSS (IBSS), an AP of a device able to connect among multiple wireless communication devices, a device able to form a wireless communication network, a device able to relay among wireless communication devices, or the like.

BS 110 may include, for example, a processor 111, a memory unit 114, a storage unit 115, and a communication unit 170. The communication unit 170 may include, for example, a transmitter 171 associated with an antenna 173, and a receiver 172 associated with an antenna 174.

In some embodiments, downlink packets are transmitted from BS 110 to MSS 130; in such cases, BS 110 may be referred to as the transmitting device, and MSS 130 may be referred to as the receiving device. In some embodiments, uplink packets are transmitted from MSS 130 to BS 110; in such cases, MSS 130 may be referred to as the transmitting device, and BS 110 may be referred to as the receiving device In some embodiments, system 100 utilizes Hybrid Automatic Repeat Request (HARQ) scheme having multi-level feedback. For example, in a downlink, BS 110 transmits to MSS 130 an encoded HARQ packet, and waits for a response from the MSS 130. Similarly, in an uplink, MSS 130 transmits to BS 110 an encoded HARQ packet, and waits for a response from the BS 110.

In some embodiments, instead of using a single-bit ACK response (indicating that the packet is correctly received and decoded) or a single-bit NACK response (indicating that the packet is not correctly received and encoded) to convey a binary HARQ feedback from the receiving device to the transmitting device, a multi-bit HARQ response is used to convey multi-level HARQ feedback from the receiving device to the transmitting device.

The multi-level HARQ feedback may indicate, for example, an estimated success level, namely, the likelihood of the receiving device (e.g., the MSS 130 for a downlink packet, or the BS 110 for an uplink packet) to correctly decode the encoded HARQ packet transmitted by the transmitting device (e.g., the BS 110 for a downlink packet, or the MSS 130 for an uplink packet). Accordingly, the receiving device notifies the transmitting device how close the receiving device is to successfully decode the encoded HARQ packet.

The multi-level HARQ feedback may utilize a notification represented using multiple bits, for example, two bits. Optionally, a look-up table may be used to associate between a feedback value and its corresponding interpretation. For example, a HARQ feedback value of "00" may indicate that the receiving device did not successfully decode the packet (namely, NACK), and that the level of success in decoding the packet is smaller than or equal to 25 percent. A HARQ feedback value of "01" may indicate that the receiving device did not successfully decode the packet (namely, NACK), and that the level of success in decoding the packet is greater than 25 percent but smaller than or equal to 75 percent. A HARQ feedback value of "10" may indicate that the receiving device did not successfully decode the packet (namely, NACK), and that the level of success in decoding the packet is greater than 75 percent. A HARQ feedback value of "11" may indicate that the receiving device successfully decoded the packet (namely, ACK).

In some embodiments, for example, the following look-up table, denoted Table 1, may be used to convert between a multi-bit value of a multi-level feedback (the left column) and a corresponding description or interpretation (the right column).

TABLE 1

| Feedback Value | Description/Interpretation |
| --- | --- |
| 00 | NACK, with success level <=25 percent |
| 01 | NACK, with success level >25 percent and success level <=75 percent |
| 10 | NACK, with success level >75 percent |
| 11 | ACK, success level = 100 percent |

In some embodiments, the success level or success rate may be estimated or calculated by a suitable hardware and/or software component of the transmitting device. For example, MSS 130 may include a success level estimator 182 to estimate or calculate the success level per downlink packet, e.g., the likelihood of the MSS 130 as receiving device to correctly decode the encoded HARQ packet transmitted downstream by the BS 110 as transmitting device. Similarly, BS 110 may include a success level estimator 181 to estimate or calculate the success level per uplink packet, e.g., the likelihood of the BS 130 as receiving device to correctly decode the encoded HARQ packet transmitted upstream by the MSS 130 as transmitting device. The success level estimator 181 and/or 182 may include, for example, components, logic and/or circuits as described herein with reference to FIG. 2, or other suitable components, logic and/or circuits.

In some embodiments, the success level estimator 181 and/or 182 may generate a success level value having a pre-defined accuracy or resolution (e.g., success level on a scale of 0 to 100, success level on a scale of 0 to 255, or the like). Additionally or alternatively, the success level estimator 181 and/or 182 may generate a categorized or classified representation, e.g., according to ranges or classes of success levels (edge, under 25 percent, above 75 percent, or the like).

Although portions of the discussion herein may use, for demonstrative purposes, an example of a dual-bit feedback representing four possible feedback values, other number of bits may be used, and other possible feedback values may be used. For example, in some embodiments, more than two bits may be used for HARQ feedback, to represent the level of success of decoding the packet at a finer resolution. In some embodiments, multiple-bit HARQ feedback and/or multi-level HARQ feedback may be included or used in a wireless communication standard or protocol. In some embodiments, a signaling mechanism may be modified or adapted to incorporate multiple-bit HARQ feedback, instead of (or in addition to) single-bit HARQ feedback.

In some embodiments, the multi-level HARQ feedback may include a success level selected from a group of three or more success levels; for example, in contrast with an "ACK or NACK" success level indicator, in contrast with a "success of failure" indicator, or in contrast with other binary indicator.

In some embodiments, the multi-level HARQ feedback may include quantifiable information (e.g., indication of a numeric success level, or a numeric range of success level), instead of or in addition to ACK or NACK information. In some embodiments, the multi-level HARQ feedback may include information other than ACK and NACK, or may include non-ACK and non-NACK information.

In some embodiments, the multi-level HARQ feedback allows the transmitting device to determine or to estimate the internal status of the receiving device, and further allows the transmitting device to make improved decisions, for example, instead of "blindly" retransmitting the packet until maximum allowed number of retransmissions is reached.

In some embodiments, the multi-level HARQ feedback may be used by the transmitting device in order to determine and/or initiate an early termination of a HARQ process. For example, after each HARQ attempt, the transmitting device checks the estimated success level, as conveyed in the multi-level HARQ feedback received from the receiving device. If the estimated success level is below a pre-defined threshold, the transmitting device may determine on early termination of the HARQ process, and may start a new HARQ process. For example, if more than 50 percent of the maximum allowed HARQ iterations elapsed, and the success level (as indicated in the multi-level HARQ feedback) is NACK with under 25 percent success rate (e.g., a feedback value of "00"), then the transmitting device may determine to terminate the current HARQ process and to start a new HARQ process, since the likelihood of the receiving device to correctly receive and decode the packet within the maximum allowed HARQ iterations is low. The early termination of the current HARQ process may reduce the overall packet latency, may increase throughput, and/or may save bandwidth by avoiding attempts to deliver a packet that is highly unlikely to be successfully received and decoded.

In some embodiments, the multi-level HARQ feedback may be used by the transmitting device in order to determine and/or initiate a quick repeat. For example, if the maximum allowed number of HARQ iterations is reached, but the success level (as indicated in the multi-level HARQ feedback) is high (e.g., greater than 75 percent), then the transmitting device may determine to continue a current HARQ process even though the maximum allowed number of retransmissions was reached, instead of starting a new HARQ process. The re-transmissions may be continued, for example, for a pre-defined number of attempts, or for a pre-defined time period. This may increase bandwidth efficiency, and/or reduce latency, for example, by re-using the packets already transmitted in the current, continued, HARQ process. In some embodiments, the transmitting device may be adapted (e.g., in a negotiation phase during network entry) to store and keep the partially-received packet(s) for the subsequent re-transmissions, and to avoid discarding the partially-received packet(s) when the maximum allowed number of retransmissions is reached.

In some embodiments, the multi-level HARQ feedback may be used for enhanced link adaptation, for example, to determine, update and/or modify a Modulation and Coding Scheme (MCS). For example, the MCS may be updated or modified by taking into account, in addition to the channel information, the success level indicated in the multi-level HARQ feedback. Optionally, the MCS may be updated or modified between HARQ attempts of a HARQ process. For example, an increased number of MCSs may be available if the HARQ multi-level feedback indicates a relatively high success level (e.g., greater than 75 percent, in contrast with smaller than 25 percent). This may increase reliability and bandwidth efficiency, for example, by dynamically adjusting the MCS, e.g., if a lastly received Channel Quality Indicator (CQI) feedback is old, obsolete, or no longer valid.

In some embodiments, the multi-level HARQ feedback indicating the success level may be used instead of or in addition to CQI feedback. Optionally, system 100 may thus utilize reduced CQI feedback, allowing reduction in CQI feedback overhead and/or improved channel knowledge at the transmitting device.

Figure 2:
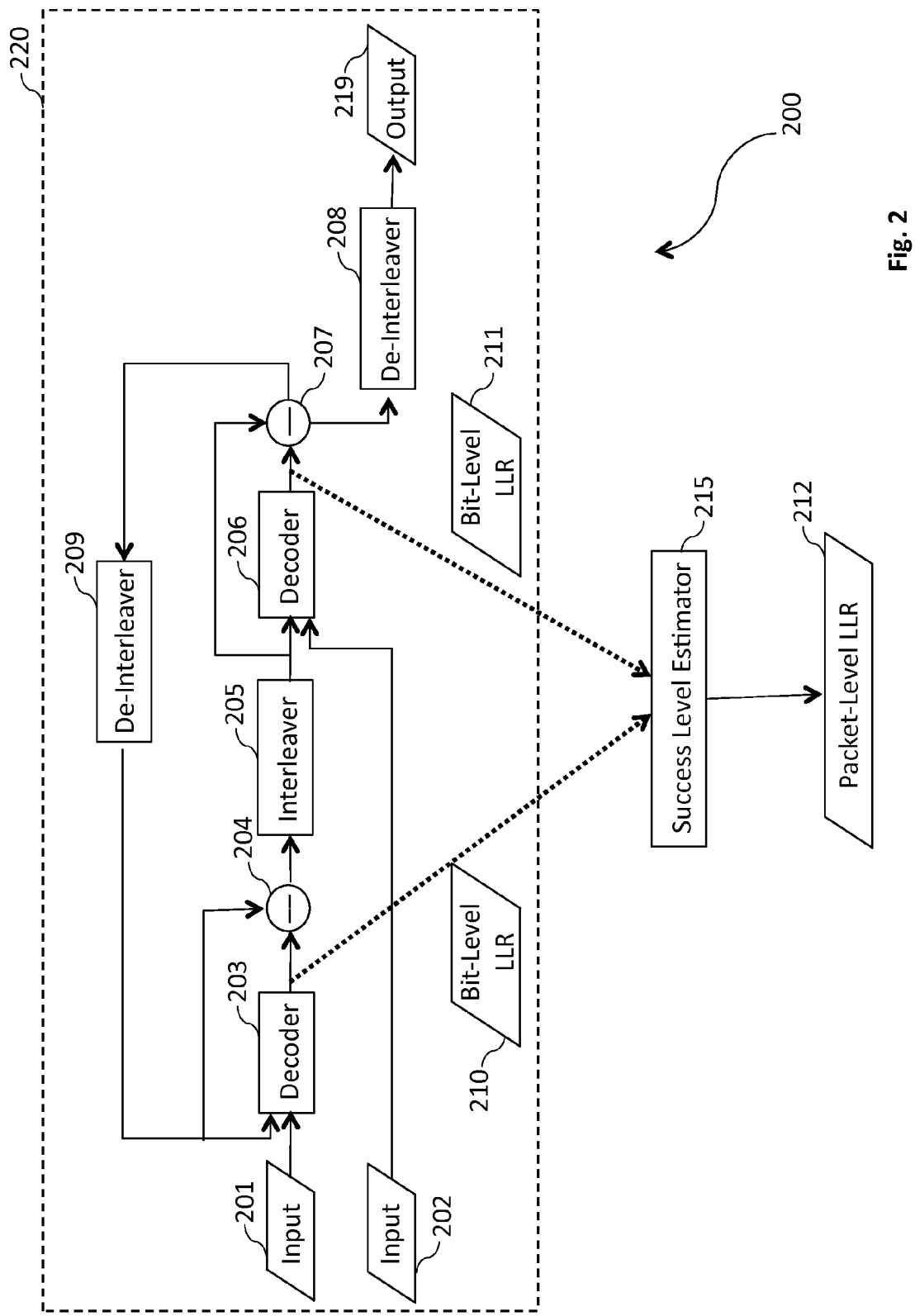
FIG. 2 is a schematic block diagram illustration of a success level estimation circuit in accordance with a demonstrative embodiment of the invention.

FIG. 2 schematically illustrates a block diagram of a success level estimation circuit 200 in accordance with some demonstrative embodiments of the invention. Circuit 200 may be, for example, a demonstrative implementation of success level estimator 181 of FIG. 1, a demonstrative implementation of success level estimator 182 of FIG. 1, a component of communication unit 170 of FIG. 1, a component of communication unit 150 of FIG. 1, a component of receiver 172 of FIG. 1, a component of receiver 152 of FIG. 1, or the like.

Circuit 200 includes, for example, a decoder sub-circuit 220 and a success level estimator 215. The decoder sub-circuit 220 may be or may include, for example, a turbo decoder having two elementary decoders that operate cooperatively. Each of the two elementary decoders produces posteriori information, which is further used as a-prior information by the other decoder.

For example, in the decoder sub-circuit 220, an incoming bitstream is received as a first input 201 to a first decoder 203, and as a second input 202 to a second decoder 206. The output of the first decoder 203 enters a first subtractor 204, whose output is interleaved by an interleaver 205. The output of the interleaver 205 enters the second decoder 206, as well as a second subtractor 207. The second subtractor further receives as input the output of the second decoder 206. The output of the second subtractor 207 enters a de-interleaver 209, whose output enters the first decoder 203 as input. The output of the de-interleaver 209 further enters the first subtractor 204 as input. Additionally, the output of the second subtractor 207 enters a de-interleaver 208, which generates a decoded (or estimated) output 219

In some embodiments, the first decoder 203 further generates as output a Log-Likelihood Ratio (LLR) output 210 per bit; and the second decoder 206 further generates as output a LLR output 211 per bit. The LLR outputs per bit 210 and 211 are transferred to a success level estimator 215 which calculates, and generates as output, a LLR per packet 212. For example, bit-level LLRs 210 and 211 are combined and/or converted into packet-level LLR 212. Optionally, the success level estimator 215 may normalize or categorize the packet-level LLR 212, for example, into pre-defined ranges of success levels, e.g., under 25 percent, above 75 percent, or the like.

Figure 3:
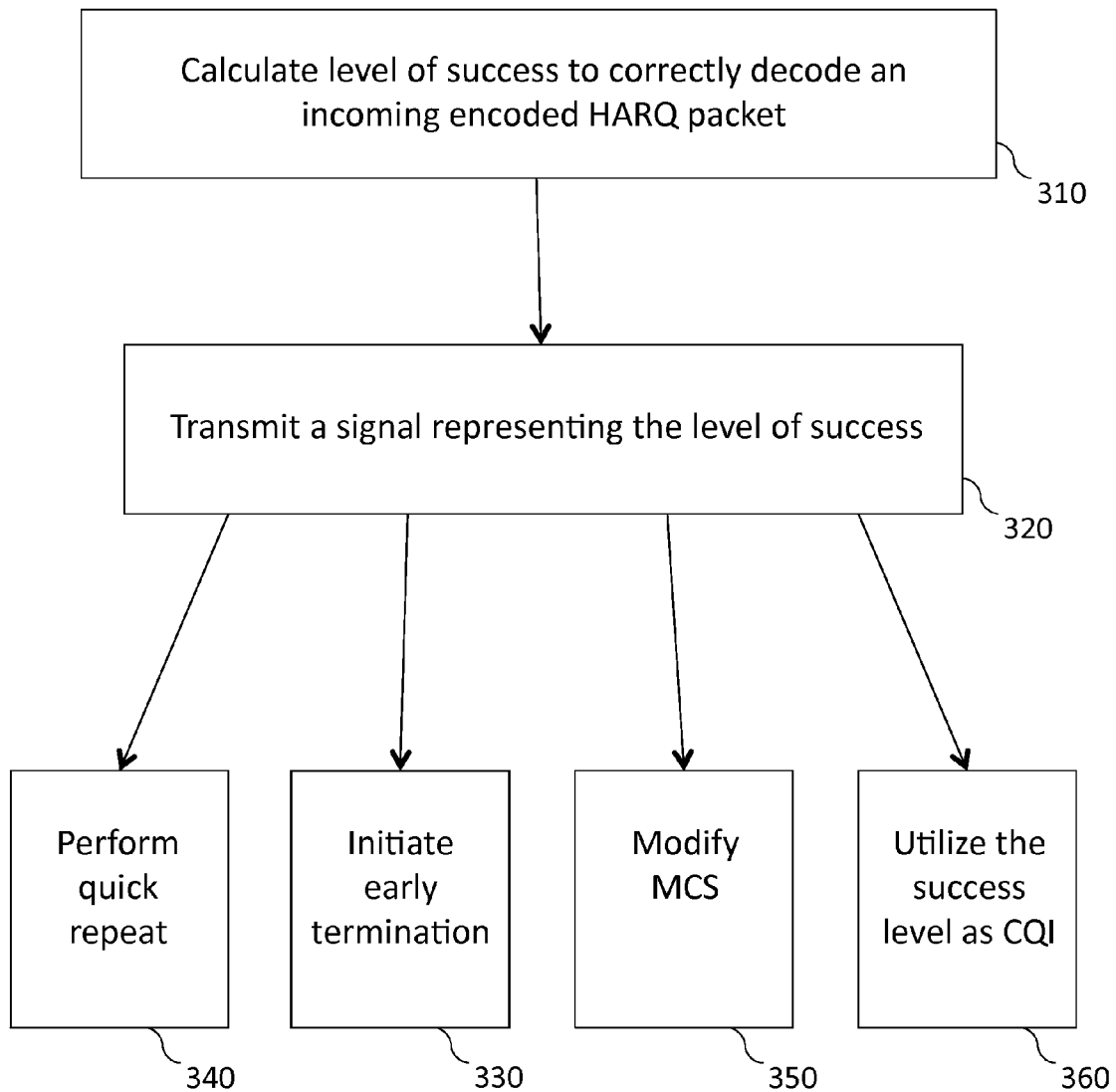
FIG. 3 is a schematic flow-chart of a method of using multi-level HARQ feedback in accordance with a demonstrative embodiment of the invention.

FIG. 3 is a schematic flow-chart of a method of using multi-level HARQ feedback in accordance with some demonstrative embodiments of the invention. Operations of the method may be used, for example, by system 100 of FIG. 1, by BS 110 of FIG. 1, by MSS 130 of FIG. 1, and/or by other suitable units, devices and/or systems.

In some embodiments, the method may include, for example, calculating a level of success to correctly decode an incoming encoded HARQ packet (block 310). This may be performed, for example, based on one or more bit-level LLRs. This may optionally include, for example, categorizing the calculated success level into a category or a range of success level (e.g., under 25 percent, above 75 percent, or the like).

In some embodiments, the method may include, for example, transmitting a signal representing the success level (block 320). This may include, for example, transmitting a multi-bit value representing a success level (or a category or range of success levels).

In some embodiments, the method may include, for example, performing one or more operations based on the success level. This may include, for example, initiating an early termination of a current HARQ process (block 330); performing a quick repeat of a current HARQ process (block 340), e.g., instead of terminating the current HARQ process once the maximum allowed number of retransmissions is reached, thereby extending the current HARQ process beyond the maximum allowed number of retransmissions; modifying a MCS (block 350); and/or utilizing the success level as a CQI (block 360), e.g., in addition to or instead of other CQI data.

Other suitable operations may be used, and other suitable orders of operation may be used. One or more operations may be repeated, for example, for a pre-defined time period, for a pre-defined number of iterations, substantially continuously, at pre-defined time intervals, until a pre-defined condition holds true, or based on other criteria.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
an estimator to estimate a success level of decoding an incoming encoded Hybrid Automatic Repeat Request packet of an incoming wireless communication signal by one or more decoders of the apparatus; and
a transmitter to transmit a multiple-bit value representing of the success level of likelihood decoding the incoming encoded Hybrid Automatic Repeat Request to a device that transmitted the incoming encoded Hybrid Automatic Repeat Request packet, wherein the estimator is to calculate a packet-level Log-Likelihood Ratio value indicating the success level of likelihood decoding the incoming encoded Hybrid Automatic Repeat Request.

2. The apparatus of claim 1, wherein the estimator is to calculate the packet-level Log-Likelihood Ratio value based on a plurality of bit-level Log-Likelihood Ratio values received from the one or more decoders.

3. The apparatus of claim 1, wherein the estimator is to categorize the success level of decoding the incoming encoded Hybrid Automatic Repeat Request as a success level range selected from a set of pre-defined success level ranges.

4. The apparatus of claim 3, wherein the set of pre-defined success level ranges comprises at least one of success levels lesser than or equal to 25 percent, and success levels greater than 75 percent.

5. The apparatus of claim 3, wherein the estimator is to generate the multiple-bit value based on a lookup table that correlates the success level ranges with corresponding multiple-bit values.

6. The apparatus of claim 1, comprising a processor to process the incoming wireless communication signal.

7. The apparatus of claim 6, wherein the apparatus comprises a device selected from a group consisting of: a Mobile Subscriber Station, and a Base Station.

8. A wireless communication system comprising:
a Base Station to transmit to a Mobile Subscriber Station an encoded Hybrid Automatic Repeat Request packet, and to receive from the Mobile Subscriber Station a multiple-bit value representing an estimated success range, selected from a set of three or more of success ranges, indicating an estimated range of success of decoding the encoded Hybrid Automatic Repeat Request packet by one or more decoders of the Mobile Subscriber Station.

9. The wireless communication system of claim 8, wherein based on the estimated success range, the Base Station is to initiate an early termination of a current Hybrid Automatic Repeat Request process.

10. The wireless communication system of claim 8, wherein based on the estimated success range, the Base Station is to perform a quick repeat of a current Hybrid Automatic Repeat Request process and to extend the current Hybrid Automatic Repeat Request process beyond a maximum allowed number of retransmissions.

11. The wireless communication system of claim 8, wherein the Base Station is to perform an operation that uses the estimated success range as a Channel Quality Indicator.

12. The wireless communication system of claim 8, wherein based on the estimated success range, the Base Station is to modify a Modulation and Coding Scheme used by the wireless communication system.

13. A method comprising:
transmitting to a station an encoded Hybrid Automatic Repeat Request packet; and
receiving from the station a multiple-bit value representing an estimated success level of decoding the encoded Hybrid Automatic Repeat Request packet by one or more decoders of the station, wherein the multiple-bit value represents an estimated success level range, selected from a set of three or more success level ranges, indicating an estimated range of success levels, which includes the estimated success level of decoding the encoded Hybrid Automatic Repeat Request packet.

14. The method of claim 13 including initiating an early termination of a current Hybrid Automatic Repeat Request process based on the estimated success level of decoding the encoded Hybrid Automatic Repeat Request packet.

15. The method of claim 13 including performing a quick repeat of a current Hybrid Automatic Repeat Request process based on the estimated success level of decoding the encoded Hybrid Automatic Repeat Request packet.

16. The method of claim 13 including modifying a Modulation and Coding Scheme based on the estimated success level of decoding the encoded Hybrid Automatic Repeat Request packet.

* * * * *

UNITED STATES PATENT AND TRADEMARK OFFICE
CERTIFICATE OF CORRECTION

PATENT NO. : 7,853,853 B2  
APPLICATION NO. : 11/865734  
DATED : December 14, 2010  
INVENTOR(S) : Mustafa Demirhan et al.

Page 1 of 1

It is certified that error appears in the above-identified patent and that said Letters Patent is hereby corrected as shown below:

In the Claims:

In column 9, line 26, in Claim 1, before "the success" delete "of".

In column 9, line 26, in Claim 1, before "decoding" delete "likelihood".

In column 9, line 31, in Claim 1, before "decoding" delete "likelihood".

Signed and Sealed this  
Fifth Day of April, 2011

David J. Kappos  
*Director of the United States Patent and Trademark Office*